(12) United States Patent
Nakamura et al.

(10) Patent No.: US 11,884,828 B2
(45) Date of Patent: Jan. 30, 2024

(54) RADIATION CURABLE INK JET COMPOSITION AND INK JET METHOD

(71) Applicant: Seiko Epson Corporation, Toyko (JP)

(72) Inventors: Kiyoshi Nakamura, Matsumoto (JP); Toru Saito, Yamagata (JP); Toshiyuki Yoda, Matsumoto (JP); Naoki Koike, Matsumoto (JP)

(73) Assignee: SEIKO EPSON CORPORATION

( * ) Notice: Subject to any disclaimer, the term of this patent is extended or adjusted under 35 U.S.C. 154(b) by 62 days.

(21) Appl. No.: 17/210,601

(22) Filed: Mar. 24, 2021

(65) Prior Publication Data

US 2021/0301162 A1 Sep. 30, 2021

(30) Foreign Application Priority Data

Mar. 25, 2020 (JP) ................................. 2020-053854

(51) Int. Cl.
*C09D 11/107* (2014.01)
*B41J 11/00* (2006.01)
(Continued)

(52) U.S. Cl.
CPC ......... *C09D 11/107* (2013.01); *B41J 11/0021* (2021.01); *B41M 5/0023* (2013.01); *C09D 11/322* (2013.01); *C09D 11/38* (2013.01)

(58) Field of Classification Search
CPC ........ C09D 11/101; C09D 5/36; C09D 11/30; C09D 11/38; B41M 7/0081;
(Continued)

(56) References Cited

U.S. PATENT DOCUMENTS

| 4,143,013 A | 3/1979 | Jenkinson et al. |
| 5,331,051 A | 7/1994 | Ishibashi et al. |

(Continued)

FOREIGN PATENT DOCUMENTS

| CN | 101305060 A | 11/2008 |
| CN | 101516632 A | 8/2009 |

(Continued)

OTHER PUBLICATIONS

Venkatram et al. "Critical Assessment of the Hildebrand and Hansen Solubility Parameters for Polymer" J. Chem Inf. Model, 2019, 59, 10, pp. 4188-4194, published Sep. 23, 2019.

(Continued)

*Primary Examiner* — John Zimmermann
(74) *Attorney, Agent, or Firm* — Harness, Dickey & Pierce, P.L.C.

(57) ABSTRACT

A radiation curable ink jet composition includes polymerizable compounds; and a photopolymerization initiator, the polymerizable compounds include a vinyl ether group-containing (meth)acrylate represented by the following general formula (I), a content of the vinyl ether group-containing (meth)acrylate with respect to a total mass of the radiation curable ink jet composition is 15 percent by mass or more, and the photopolymerization initiator includes ethyl (2,4,6-trimethylbenzoyl)phenylphosphinate.

$$H_2C=CR^1-CO-OR^2-O-CH=CH-R^3 \quad (I)$$

In the above formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

9 Claims, 1 Drawing Sheet

(51) Int. Cl.
*B41M 5/00* (2006.01)
*C09D 11/322* (2014.01)
*C09D 11/38* (2014.01)

(58) Field of Classification Search
CPC .... B41M 5/5209; B41J 11/00214; B41J 2/01; C08F 220/1811
See application file for complete search history.

(56) References Cited

U.S. PATENT DOCUMENTS

| | | | | |
|---|---|---|---|---|
| 6,306,502 | B1 * | 10/2001 | Fukushima | C09D 4/00 |
| | | | | 522/28 |
| 6,552,102 | B2 * | 4/2003 | Poetsch | C09B 67/0097 |
| | | | | 522/182 |
| 8,137,793 | B2 | 3/2012 | Kameyama et al. | |
| 8,501,830 | B2 | 8/2013 | Selman et al. | |
| 8,564,142 | B2 | 10/2013 | Ito et al. | |
| 8,940,813 | B2 | 1/2015 | Araki et al. | |
| 9,051,481 | B2 | 6/2015 | Yoshino et al. | |
| 9,090,636 | B2 * | 7/2015 | Carpentier | C07F 3/06 |
| 9,101,955 | B2 | 8/2015 | Araki et al. | |
| 9,855,693 | B2 | 1/2018 | Umebayashi | |
| 10,563,075 | B2 | 2/2020 | Umebayashi | |
| 10,590,297 | B2 | 3/2020 | Nakano et al. | |
| 10,767,068 | B2 | 9/2020 | Nakashima et al. | |
| 2004/0010052 | A1 | 1/2004 | Shizuka et al. | |
| 2006/0066697 | A1 | 3/2006 | Inoue | |
| 2007/0046719 | A1 | 3/2007 | Yamanobe et al. | |
| 2007/0206045 | A1 | 9/2007 | Umebayashi et al. | |
| 2007/0259986 | A1 | 11/2007 | Elwakil et al. | |
| 2008/0090929 | A1 | 4/2008 | Wilson et al. | |
| 2008/0206527 | A1 | 8/2008 | Hayata | |
| 2009/0117343 | A1 | 5/2009 | Nishida et al. | |
| 2009/0197055 | A1 | 8/2009 | Yokoi | |
| 2009/0202795 | A1 | 8/2009 | Hayata et al. | |
| 2009/0280265 | A1 | 11/2009 | Oyanagi et al. | |
| 2009/0289973 | A1 | 11/2009 | Makuta et al. | |
| 2010/0068386 | A1 | 3/2010 | Kanbe et al. | |
| 2010/0133728 | A1 | 6/2010 | Yonezawa et al. | |
| 2010/0233448 | A1 | 9/2010 | Kameyama et al. | |
| 2010/0285282 | A1 | 11/2010 | Selman et al. | |
| 2011/0171677 | A1 * | 7/2011 | Braslau | G01N 33/52 |
| | | | | 436/106 |
| 2011/0223391 | A1 | 9/2011 | Nishimura et al. | |
| 2011/0242191 | A1 | 10/2011 | Mochizuki | |
| 2012/0113201 | A1 | 5/2012 | Kagose et al. | |
| 2012/0133059 | A1 | 5/2012 | Ito et al. | |
| 2012/0176456 | A1 | 7/2012 | Maekawa et al. | |
| 2012/0189822 | A1 | 7/2012 | Ito et al. | |
| 2012/0200653 | A1 * | 8/2012 | Shimohara | C09D 11/101 |
| | | | | 524/530 |
| 2012/0229583 | A1 | 9/2012 | Fukumoto et al. | |
| 2012/0274717 | A1 | 11/2012 | Nakano et al. | |
| 2013/0010039 | A1 | 1/2013 | Kida et al. | |
| 2013/0025807 | A1 * | 1/2013 | Wernersson | D21C 9/002 |
| | | | | 162/146 |
| 2013/0260092 | A1 | 10/2013 | Araki et al. | |
| 2013/0286120 | A1 | 10/2013 | Kobayashi et al. | |
| 2013/0295342 | A1 | 11/2013 | Araki et al. | |
| 2014/0022299 | A1 | 1/2014 | Yokoi et al. | |
| 2014/0362151 | A1 | 12/2014 | Ito et al. | |
| 2014/0370214 | A1 | 12/2014 | Araki et al. | |
| 2014/0370250 | A1 | 12/2014 | Fujii et al. | |
| 2015/0064398 | A1 | 3/2015 | Umebayashi | |
| 2015/0077481 | A1 | 3/2015 | Yoshino et al. | |
| 2015/0116425 | A1 | 4/2015 | De Meutter et al. | |
| 2015/0130878 | A1 | 5/2015 | Kohzuki et al. | |
| 2015/0240094 | A1 | 8/2015 | Kagose et al. | |
| 2015/0291818 | A1 | 10/2015 | Kida et al. | |
| 2015/0315396 | A1 | 11/2015 | Kida et al. | |
| 2015/0344709 | A1 | 12/2015 | Araki | |
| 2015/0344722 | A1 * | 12/2015 | Lin | C09D 4/00 |
| | | | | 428/483 |
| 2016/0001578 | A1 | 1/2016 | Kobayashi et al. | |
| 2016/0083604 | A1 | 3/2016 | Steert et al. | |
| 2016/0102216 | A1 | 4/2016 | Hirade et al. | |
| 2016/0160062 | A1 | 6/2016 | Kida et al. | |
| 2016/0222146 | A1 | 8/2016 | Yamashita et al. | |
| 2016/0312052 | A1 | 10/2016 | Cong et al. | |
| 2017/0058135 | A1 | 3/2017 | Kohzuki et al. | |
| 2017/0233594 | A1 | 8/2017 | Yoda et al. | |
| 2017/0240659 | A1 * | 8/2017 | Norcini | C07F 9/3252 |
| 2017/0240754 | A1 | 8/2017 | Tsuchiya et al. | |
| 2017/0252971 | A1 | 9/2017 | Umebayashi | |
| 2017/0283631 | A1 | 10/2017 | Paul et al. | |
| 2018/0002552 | A1 | 1/2018 | Nakano et al. | |
| 2018/0079921 | A1 * | 3/2018 | Okamoto | C09B 67/0084 |
| 2018/0136559 | A1 * | 5/2018 | Sakai | G03F 7/0385 |
| 2018/0154658 | A1 | 6/2018 | Kobayashi et al. | |
| 2018/0223117 | A1 | 8/2018 | Toeda et al. | |
| 2018/0244933 | A1 | 8/2018 | Tsuchiya et al. | |
| 2018/0273778 | A1 | 9/2018 | Saito et al. | |
| 2018/0362279 | A1 | 12/2018 | Yoshida et al. | |
| 2019/0008519 | A1 | 1/2019 | Nativ et al. | |
| 2019/0085190 | A1 | 3/2019 | De Meutter | |
| 2019/0092957 | A1 | 3/2019 | Nakano et al. | |
| 2020/0247146 | A1 | 8/2020 | Kobayashi et al. | |
| 2020/0254784 | A1 | 8/2020 | Sato et al. | |
| 2020/0255677 | A1 | 8/2020 | Tanaka et al. | |
| 2020/0255678 | A1 | 8/2020 | Sekine et al. | |
| 2020/0255679 | A1 | 8/2020 | Sekine et al. | |
| 2020/0255682 | A1 | 8/2020 | Tanaka et al. | |
| 2020/0270286 | A1 | 8/2020 | Miyamoto et al. | |
| 2020/0392353 | A1 | 12/2020 | Tanaka et al. | |
| 2020/0392357 | A1 | 12/2020 | Sekine et al. | |
| 2021/0071024 | A1 | 3/2021 | Tanaka et al. | |
| 2021/0079242 | A1 * | 3/2021 | Yoda | C09D 11/322 |

FOREIGN PATENT DOCUMENTS

| | | |
|---|---|---|
| CN | 101831214 A | 9/2010 |
| CN | 102558958 A | 7/2012 |
| CN | 102585599 A | 7/2012 |
| CN | 107602776 A | 1/2018 |
| CN | 108624139 A | 10/2018 |
| CN | 108884342 A | 11/2018 |
| CN | 109554018 A | 4/2019 |
| EP | 2471879 A1 | 7/2012 |
| EP | 2502967 A2 | 9/2012 |
| EP | 2 644 664 A1 | 10/2013 |
| EP | 2 653 511 A1 | 10/2013 |
| EP | 2 848 660 A1 | 3/2015 |
| EP | 2842763 A2 | 3/2015 |
| EP | 3222684 A1 | 9/2017 |
| JP | 2006-299117 A | 11/2006 |
| JP | 2006-312711 A | 11/2006 |
| JP | 2007-321034 A | 12/2007 |
| JP | 2008-163080 A | 7/2008 |
| JP | 2008-189887 A | 8/2008 |
| JP | 2008-208190 A | 9/2008 |
| JP | 2008-214395 A | 9/2008 |
| JP | 2009-185186 A | 8/2009 |
| JP | 2009-203287 A | 9/2009 |
| JP | 2010-184996 A | 8/2010 |
| JP | 2010-235914 A | 10/2010 |
| JP | 2011-095602 A | 5/2011 |
| JP | 2011-168735 A | 9/2011 |
| JP | 2011-225824 A | 11/2011 |
| JP | 2012-116928 A | 6/2012 |
| JP | 2012-126885 A | 7/2012 |
| JP | 2012-140550 A | 7/2012 |
| JP | 2012-153853 A | 8/2012 |
| JP | 2012-158672 A | 8/2012 |
| JP | 2012-162688 A | 8/2012 |
| JP | 2012-201815 A | 10/2012 |
| JP | 2013-079383 A | 5/2013 |
| JP | 2013-163740 A | 8/2013 |
| JP | 2013-227515 A | 11/2013 |
| JP | 2013-240978 A | 12/2013 |
| JP | 2013-240980 A | 12/2013 |
| JP | 2014-070135 A | 4/2014 |
| JP | 2014-196414 A | 10/2014 |
| JP | 2014-198748 A | 10/2014 |

(56) References Cited

FOREIGN PATENT DOCUMENTS

| | | |
|---|---|---|
| JP | 2014-240153 A | 12/2014 |
| JP | 2015-014009 A | 1/2015 |
| JP | 2015-048387 A | 3/2015 |
| JP | 2015-081284 A | 4/2015 |
| JP | 2015-091662 A | 5/2015 |
| JP | 2015-178609 A | 10/2015 |
| JP | 2015-203051 A | 11/2015 |
| JP | 2015-533897 A | 11/2015 |
| JP | 2015-224340 A | 12/2015 |
| JP | 2016-041820 A | 3/2016 |
| JP | 2016-153498 A | 8/2016 |
| JP | 2017-002187 A | 1/2017 |
| JP | 2017-141382 A | 8/2017 |
| JP | 2017-149825 A | 8/2017 |
| JP | 2017-155181 A | 9/2017 |
| JP | 2017-155190 A | 9/2017 |
| JP | 2018-009142 A | 1/2018 |
| JP | 2018-127527 A | 8/2018 |
| JP | 2018-141101 A | 9/2018 |
| JP | 2018-162375 A | 10/2018 |
| JP | 2019-508534 A | 3/2019 |
| JP | 2019-059807 A | 4/2019 |
| JP | 2019-081867 A | 5/2019 |
| JP | 2019-151703 A | 9/2019 |
| JP | 2019-151714 A | 9/2019 |
| JP | 2020-519561 A | 7/2020 |
| WO | 2014-051702 A1 | 4/2014 |
| WO | 2015-140538 A1 | 9/2015 |
| WO | 2016-098636 A1 | 6/2016 |

OTHER PUBLICATIONS

G. Jing et al., "Series on 500 Questions About Practical Printing and Packaging Technology", 200 Questions About UV Glazing Process and Technology, Graphic Communications Press, Mar. 5, 2023, with English translation (7 Pages).

* cited by examiner

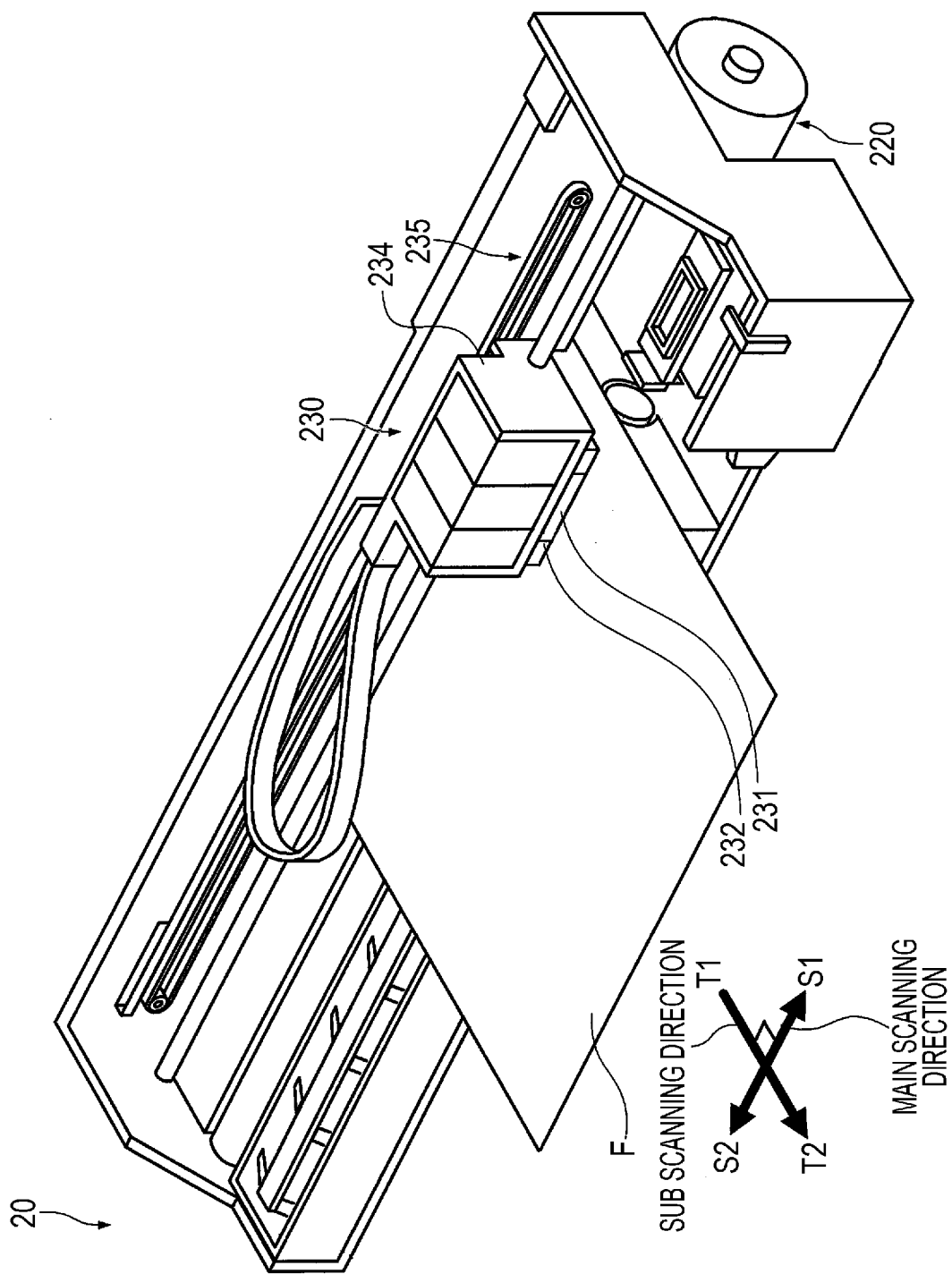

RADIATION CURABLE INK JET COMPOSITION AND INK JET METHOD

The present application is based on, and claims priority from JP Application Serial Number 2020-053854, filed Mar. 25, 2020, the disclosure of which is hereby incorporated by reference herein in its entirety.

BACKGROUND

1. Technical Field

The present disclosure relates to a radiation curable ink jet composition and an ink jet method.

2. Related Art

An ink jet recording method is able to record a highly fine image by a relatively simple apparatus and has been rapidly developed in various fields. In particular, various investigations have been carried out on, for example, a curing property of a coating film of an ink jet composition which is cured by radiation emission. In order to provide an ultraviolet curable ink jet ink composition having an excellent curing property which can be used for both a thin cured film and a thick cured film, for example, JP-A-2012-126885 has disclosed an ultraviolet curable ink jet composition containing a vinyl ether group-containing (meth)acrylate, a monofunctional (meth)acrylate having an aromatic ring skeleton, and a photopolymerization initiator.

The vinyl ether group-containing (meth)acrylate disclosed in the above patent document has advantages, such as a low viscosity and an excellent curing property. However, on the other hand, the vinyl ether group-containing (meth)acrylate has been gradually understood to have a problem in that a solid photopolymerization initiator at ordinary temperature is difficult to dissolve. Accordingly, as disclosed in JP-A-2012-126885, in view of the solubility of the photopolymerization initiator, the use of an aromatic-based monomer, such as phenoxyethyl acrylate, has been considered. However, since the aromatic-based monomer as described above has a relatively high viscosity, the advantage to decrease the viscosity by the vinyl ether group-containing (meth)acrylate may be spoiled in some cases.

SUMMARY

According to an aspect of the present disclosure, there is provided a radiation curable ink jet composition comprising: polymerizable compounds; and a photopolymerization initiator, the polymerizable compounds include a vinyl ether group-containing (meth)acrylate represented by the following general formula (I), a content of the vinyl ether group-containing (meth)acrylate with respect to a total mass of the radiation curable ink jet composition is 15 percent by mass or more, and the photopolymerization initiator includes ethyl (2,4,6-trimethylbenzoyl)phenylphosphinate.

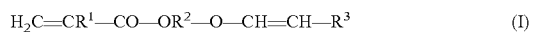
$$H_2C=CR^1-CO-OR^2-O-CH=CH-R^3 \qquad (I)$$

In the above formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

According to another aspect of the present disclosure, there is provided an ink jet method comprising: an ejection step of ejecting the radiation curable ink jet composition described above by a liquid ejection head so as to be adhered to a recording medium; and an emission step of emitting radiation rays to the radiation curable ink jet composition adhered to the recording medium.

BRIEF DESCRIPTION OF THE DRAWINGS

FIGURE is a perspective view showing a serial type ink jet apparatus according to this embodiment.

DESCRIPTION OF EXEMPLARY EMBODIMENTS

Hereinafter, if needed, with reference to the drawing, although an embodiment (hereinafter, referred to as "this embodiment") of the present disclosure will be described in detail, the present disclosure is not limited thereto and may be variously changed and/or modified without departing from the scope of the present disclosure. In addition, in the drawing, elements similar or equivalent to each other are designated by the same reference numeral, and duplicated description will be omitted. In addition, the positional relationship, such as top to bottom and/or right to left, is based on the positional relationship shown in the drawing, unless otherwise particularly noted. Furthermore, a dimensional ratio in the drawing is not limited to the ratio shown therein.

In the present specification, "(meth)acryloyl" represents at least one of an acryloyl and a methacryloyl corresponding thereto, "(meth)acrylate" represents at least one of an acrylate and a methacrylate corresponding thereto, and "(meth)acryl" represents at least one of an acryl and a methacryl corresponding thereto.

1. Radiation Curable Ink Jet Composition

A radiation curable ink jet composition (hereinafter, simply referred to as "composition" in some cases) of this embodiment includes polymerizable compounds and a photopolymerization initiator, the polymerizable compounds include a vinyl ether group-containing (meth)acrylate represented by the following general formula (I), a content of the vinyl ether group-containing (meth)acrylate with respect to a total mass of the composition is 15 percent by mass or more, and the photopolymerization initiator includes ethyl (2,4,6-trimethylbenzoyl)phenylphosphinate.

$$H_2C=CR^1-CO-OR^2-O-CH=CH-R^3 \qquad (I)$$

In the above formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

In addition, the radiation curable ink jet composition according to this embodiment may also include, if needed, at least one polymerizable compound other than that described above, at least one photopolymerization initiator other than that described above, a polymerization inhibitor, a sensitizer, a fluorescent whitner, a leveling agent, a colorant, and/or the like.

Although having advantages, such as a low viscosity and an excellent curing property, the vinyl ether group-containing (meth)acrylate has been gradually understood to have a problem in that a solid photopolymerization initiator at ordinary temperature is difficult to dissolve. Accordingly, in a related radiation curable ink jet composition containing a vinyl ether group-containing (meth)acrylate, in view of the solubility of the photopolymerization initiator, an aromatic-based monomer, such as phenoxyethyl acrylate, has been used in combination therewith.

However, since the aromatic-based monomer as described above has a viscosity higher than that of the vinyl ether group-containing (meth)acrylate, a decrease in viscosity by the vinyl ether group-containing (meth)acrylate may be counteracted thereby. Furthermore, in view of the solubility of the photopolymerization initiator, when a use amount of the aromatic-based monomer is relatively increased, a use amount of the other monomers is required to be relatively decreased, and as a result, there may be a problem in that a monomer composition necessary to obtain desired physical properties of an ink coating film is difficult to realize.

On the other hand, in this embodiment, ethyl (2,4,6-trimethylbenzoyl)phenylphosphinate which is a liquid photopolymerization initiator at ordinary temperature is used. Accordingly, the problem in that the vinyl ether group-containing (meth)acrylate is inferior in terms of the solubility of the photopolymerization initiator and the restriction in which the photopolymerization initiator is dissolved by the aromatic-based monomer can be removed. In addition, as a result, in this embodiment, since the viscosity of the radiation curable ink jet composition can be further decreased, and the degree of freedom in monomer design can be secured, the physical properties of an ink coating film to be obtained can be further improved.

In addition, the "radiation curable ink jet composition" according to this embodiment is a composition which is used by ejection from an ink jet head by an ink jet method. Hereinafter, as one embodiment of the radiation curable ink jet composition, although a radiation curable ink composition will be described, the composition according to this embodiment may also be, besides the ink composition, a composition to be used for 3D formation and the like.

In addition, the radiation curable ink jet composition of this embodiment is cured by emission of radiation rays. As the radiation rays, for example, there may be mentioned ultraviolet rays, electron rays, infrared rays, visible light rays, x-rays, or active energy rays. As the radiation rays, since an UV radiation source is easily available and is widely used, and a material to be suitably cured by emission of ultraviolet rays is easily available and is widely used, ultraviolet rays are preferable.

Hereinafter, components to be contained in the radiation curable ink jet composition according to this embodiment and a manufacturing method thereof will be described.

1.1. Polymerizable Compound

In this embodiment, compounds to be cured by radiation emission are collectively called polymerizable compounds. As the polymerizable compound, a monofunctional monomer having one polymerizable functional group or a polyfunctional monomer having at least two polymerizable functional groups may be mentioned, and if needed, an oligomer having at least one polymerizable functional group may also be mentioned. The polymerizable compound may be used alone, or at least two types thereof may be used in combination.

The composition of this embodiment includes a vinyl ether group-containing (meth)acrylate as the polymerizable compound and may also include, if needed, other polymerizable compounds. Although the other polymerizable compounds are not particularly limited, for example, a monofunctional monomer, a polyfunctional monomer different from the vinyl ether group-containing (meth)acrylate, and/or an oligomer, such as an urethane oligomer, may be mentioned.

1.1.1. Vinyl Ether Group-Containing (Meth)Acrylate

Since the vinyl ether group-containing (meth)acrylate represented by the following formula (I) is contained, the viscosity of the composition is decreased, and an ejection stability thereof tends to be further improved. In addition, the curing property of the composition is further improved, and in association with the improvement of the curing property, a recording rate can also be further increased.

$$H_2C=CR^1-CO-OR^2-O-CH=CH-R^3 \quad (I)$$

In the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

In the above formula (I), as the divalent organic residue having 2 to 20 carbon atoms represented by $R^2$, for example, there may be mentioned a substituted or unsubstituted linear, branched, or cyclic alkylene group having 2 to 20 carbon atoms, a substituted or unsubstituted alkylene group having an oxygen atom derived from an ether bond and/or an ester bond in the structure and having 2 to 20 carbon atoms, or a substituted or unsubstituted divalent aromatic group having 6 to 11 carbon atoms. Among those mentioned above, for example, an alkylene group, such as an ethylene group, an n-propylene group, an isopropylene group, or a butylene group, having 2 to 6 carbon atoms or an alkylene group, such as an oxyethylene group, an oxy-n-propylene group, an oxyisopropylene group, or an oxybutylene group, having an oxygen atom derived from an ether bond in the structure and having 2 to 9 carbon atoms is preferable. In addition, in order to further decrease the viscosity of the composition and to further improve the curing property thereof, a compound having a glycol ether chain is more preferable in which $R^2$ represents an alkylene group, such as an oxyethylene group, an oxy-n-propylene group, an oxyisopropylene group, or an oxybutylene group, having an oxygen atom derived from an ether bond in the structure and having 2 to 9 carbon atoms.

In the above formula (I), as the monovalent organic residue having 1 to 11 carbon atoms represented by $R^3$, a substituted or unsubstituted linear, branched, or cyclic alkyl group having 1 to 10 carbon atoms or a substituted or unsubstituted aromatic group having 6 to 11 carbon atoms is preferable. Among those mentioned above, an alkyl group, such as a methyl group or an ethyl group, having 1 to 2 carbon atoms or an aromatic group, such as a phenyl group or a benzyl group, having 6 to 8 carbon atoms is preferably used.

In the case in which the above organic residue may be a substituted residue, the substituent thereof can be classified into a group containing at least one carbon atom and a group containing no carbon atoms. First of all, when the substituent is a group containing at least one carbon atom, the number of carbon atoms thereof is counted as the number of carbon atoms of the organic residue. Although the group containing at least one carbon atom is not limited to those mentioned below, for example, a carboxyl group or an alkoxy group may be mentioned. Next, although the group containing no carbon atoms is not limited to those mentioned below, for example, a hydroxy group or a halo group may be mentioned.

A particular example of the compound represented by the formula (I) is not particularly limited, and for example, there may be mentioned (meth)acrylic acid 2-vinyloxyethyl, (meth)acrylic acid 3-vinyloxypropyl, (meth)acrylic acid 1-methyl-2-vinyloxyethyl, (meth)acrylic acid 2-vinyloxypropyl, (meth)acrylic acid 4-vinyloxybutyl, (meth)acrylic acid 1-methyl-3-vinyloxypropyl, (meth)acrylic acid 1-vinyloxymethylpropyl, (meth)acrylic acid 2-methyl-3-vinyloxypropyl, (meth)acrylic acid 1,1-dimethyl-2-vinyloxyethyl, (meth)acrylic acid 3-vinyloxybutyl, (meth)acrylic acid 1-methyl-2-vinyloxypropyl, (meth)acrylic acid 2-vinyloxybutyl, (meth)acrylic acid 4-vinyloxycyclohexyl, (meth)acrylic acid 6-vinyloxycyclohexyl, (meth)acrylic acid 4-vinyloxymethylcyclohexylmethyl, (meth)acrylic acid 3-vinyloxymethylcyclohexylmethyl, (meth)acrylic acid 2-vinyloxymethylcyclohexylmethyl, (meth)acrylic acid p-vinyloxymethylphenylmethyl, (meth)acrylic acid m-vinyloxymethylphenylmethyl, (meth)acrylic acid o-vinyloxymethylphenylmethyl, methacrylic acid 2-(2-vinyloxyethoxy)ethyl, acrylic acid 2-(2-vinyloxyethoxy)ethyl, (meth)acrylic acid 2-(vinyloxyisopropoxy)ethyl, (meth)acrylic acid 2-(vinyloxyethoxy)propyl, (meth)acrylic acid 2-(vinyloxyethoxy)isopropyl, (meth)acrylic acid 2-(vinyloxyisopropoxy)propyl, (meth)acrylic acid 2-(vinyloxyisopropoxy)isopropyl, (meth)acrylic acid 2-(vinyloxyethoxyethoxy)ethyl, (meth)acrylic acid 2-(vinyloxyethoxyisopropoxy)ethyl, (meth)acrylic acid 2-(vinyloxyisopropoxyethoxy)ethyl, (meth)acrylic acid 2-(vinyloxyisopropoxyisopropoxy)ethyl, (meth)acrylic acid 2-(vinyloxyethoxyethoxy)propyl, (meth)acrylic acid 2-(vinyloxyethoxyisopropoxy)propyl, (meth)acrylic acid 2-(vinyloxyisopropoxyethoxy)propyl, (meth)acrylic acid 2-(vinyloxyisopropoxyisopropoxy)propyl, (meth)acrylic acid 2-(vinyloxyethoxyethoxy)isopropyl, (meth)acrylic acid 2-(vinyloxyethoxyisopropoxy)isopropyl, (meth)acrylic acid 2-(vinyloxyisopropoxyethoxy)isopropyl, (meth)acrylic acid 2-(vinyloxyisopropoxyisopropoxy)isopropyl, (meth)acrylic acid 2-(vinyloxyethoxyethoxyethoxy)ethyl, (meth)acrylic acid 2-(vinyloxyethoxyethoxyethoxy)ethyl, (meth)acrylic acid 2-(isopropenoxyethoxy)ethyl, (meth)acrylic acid 2-(isopropenoxyethoxyethoxy)ethyl, (meth)acrylic acid 2-(isopropenoxyethoxyethoxyethoxy)ethyl, (meth)acrylic acid 2-(isopropenoxyethoxyethoxyethoxyethoxy)ethyl, (meth)acrylic acid polyethylene glycol monovinyl ether, or (meth)acrylic acid polypropylene glycol monovinyl ether. Among those particular examples, since the balance between the curing property and the viscosity of the composition is likely to be obtained, acrylic acid 2-(2-vinyloxyethoxy)ethyl is particularly preferable. In addition, in this embodiment, acrylic acid 2-(2-vinyloxyethoxy)ethyl is also called VEEA in some cases.

The content of the vinyl ether group-containing (meth)acrylate with respect to the total mass of the composition is preferably 65 percent by mass or less, more preferably 55 percent by mass or less, further preferably 50 percent by mass or less, and particularly preferably 45 percent by mass or less. In addition, the content of the vinyl ether group-containing (meth)acrylate with respect to the total mass of the composition is preferably 15 percent by mass or more, more preferably 20 percent by mass or more, more preferably 25 percent by mass or more, and further preferably 30 percent by mass or more. Since the content of the vinyl ether group-containing (meth)acrylate with respect to the total mass of the composition is 15 percent by mass or more, the curing property of the composition is further improved, the viscosity of the composition is decreased, and the ejection stability thereof is further improved. In addition, since the content of the vinyl ether group-containing (meth)acrylate with respect to the total mass of the composition is 65 percent by mass or less, the adhesion of the coating film tends to be further improved.

1.1.2. Monofunctional Monomer

The monofunctional monomer is not particularly limited, and for example, an aromatic-based monofunctional monomer, a nitrogen-containing monofunctional monomer, or a monofunctional monomer having a polycyclic hydrocarbon group may be mentioned. Since the monomer as described above is used, the curing property of the composition tends to be further improved, and in addition, the abrasion resistance, stretchability, and adhesion of the coating film tend to be further improved.

1.1.2.1. Aromatic-Based Monofunctional Monomer

The aromatic-based monofunctional monomer is not particularly limited, and for example, there may be mentioned phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, or 2-hydroxy-3-phneoxypropyl (meth)acrylate.

Among those mentioned above, phenoxyethyl (meth)acrylate and benzyl (meth)acrylate are preferable, phenoxyethyl (meth)acrylate is more preferable, and phenoxyethyl acrylate (PEA) is further preferable. Since the aromatic-based monofunctional monomer as described above is used, the solubility of a solid photopolymerization initiator is further improved, and the curing property of the composition tends to be further improved. Hence, when an acylphosphine oxide-based photopolymerization initiator or a thioxanthone-based photopolymerization initiator, which is a solid initiator at ordinary temperature, is used in combination with ethyl (2,4,6-trimethylbenzoyl)phenylphosphinate, the solubility thereof tends to be improved.

The content of the aromatic-based monofunctional monomer with respect to the total mass the composition is preferably more than 0 percent by mass, more preferably 5.0 percent by mass or more, further preferably 10 percent by mass or more, and even further preferably 15 percent by mass or more. In addition, the content of the aromatic-based monofunctional monomer with respect to the total mass of the composition is preferably 50 percent by mass or less, more preferably 35 percent by mass or less, even more preferably 30 percent by mass or less, further preferably 28 percent by mass or less, and even further preferably 25 percent by mass or less. In addition, the aromatic-based monofunctional monomer may be contained at a level lower than the detection limit or may not be contained. In this embodiment, since ethyl (2,4,6-trimethylbenzoyl)phenylphosphinate, which will be described later, is used, the problem in terms of the solubility of a related solid photopolymerization initiator can be solved. Hence, an addition amount of the aromatic-based monofunctional monomer used to improve the solubility of the photopolymerization initiator can be decreased, and hence, the composition of the polymerizable compounds can be more flexibly designed. As a result, the adhesion and the abrasion resistance of the coating film tend to be further improved. In addition, since the aromatic-based monofunctional monomer is contained in the range described above, when a solid photopolymerization initiator is used in combination with ethyl (2,4,6-trimethylbenzoyl)phenylphosphinate, the solubility thereof tends to be improved.

1.1.2.2. Nitrogen-Containing Monofunctional Monomer

The nitrogen-containing monofunctional monomer is not particularly limited, and for example, there may be mentioned a nitrogen-containing monofunctional vinyl monomer, such as N-vinylcaprolactam, N-vinylformamide, N-vinylcarbazole, N-vinylacetamide, or N-vinylpyrrolidone; a nitrogen-containing monofunctional acrylate monomer, such as acryloylmorpholine or dimethylaminoethyl acrylate benzyl chloride quaternary salt; a nitrogen-containing monofunctional acrylamide monomer, such as (meth)acrylamide, N-hydroxymethyl (meth)acrylamide, diacetone (meth)acrylamide, or N,N-dimethyl (meth)acrylamide.

Among those mentioned above, the nitrogen-containing monofunctional vinyl monomer or the nitrogen-containing monofunctional acrylate monomer is preferably contained, and a monomer, such as N-vinylcaprolactam, N-vinylcarbazole, N-vinylpyrrolidone, or acryloylmorpholine, having a nitrogen-containing heterocyclic structure is more preferably contained. When the nitrogen-containing monofunctional monomer as described above is used, the abrasion resistance, the flexibility, and the adhesion of the coating film tend to be further improved.

The content of the nitrogen-containing monofunctional monomer with respect to the total mass of the composition is preferably 3.0 to 17 percent by mass, more preferably 5.0 to 15 percent by mass, and further preferably 7.0 to 12 percent by mass. Since the content of the nitrogen-containing monofunctional monomer with respect to the total mass of the composition is in the range described above, while the viscosity of the composition is maintained low, the adhesion and the abrasion resistance of the coating film tend to be further improved.

1.1.2.3. Monofunctional Monomer Having Polycyclic Hydrocarbon Group

The monofunctional monomer having a polycyclic hydrocarbon group is not particularly limited, and for example, there may be mentioned an acrylate, such as dicyclopentenyl acrylate or dicyclopentenyloxyethyl acrylate, having an unsaturated polycyclic hydrocarbon group; or an acrylate, such as dicyclopentanyl acrylate or isobornyl acrylate, having a saturated polycyclic hydrocarbon group. Among those mentioned above, the acrylate having a saturated polycyclic hydrocarbon group is preferable, and isobornyl acrylate is more preferable. When the monofunctional monomer having a polycyclic hydrocarbon group as described above is used, the abrasion resistance of the coating film tends to be further improved.

The content of the monofunctional monomer having a polycyclic hydrocarbon group with respect to the total mass of the composition is preferably 5 to 40 percent by mass, more preferably 10 to 40 percent by mass, and further preferably 15 to 35 percent by mass. Since the content of the monofunctional monomer having a polycyclic hydrocarbon group with respect to the total mass of the composition is in the range described above, the abrasion resistance of the coating film tends to be further improved.

1.1.3. Polyfunctional Monomer Different from Vinyl Ether Group-Containing(Meth)Acrylate The polyfunctional monomer different from the vinyl ether group-containing (meth)acrylate is not particularly limited, and for example, a polyfunctional (meth)acrylate may be mentioned.

The content of the different polyfunctional monomer described above with respect to the total mass of the composition is preferably 5.0 to 35 percent by mass, more preferably 7.0 to 30 percent by mass, and further preferably 10 to 27 percent by mass. Since the content of the different polyfunctional monomer with respect to the total mass of the composition is in the range described above, the abrasion resistance, the stretchability, and the adhesion of the coating film tend to be further improved.

Hereinafter, although the different polyfunctional monomer described above will be described by way of example, the polyfunctional monomer according to this embodiment is not limited thereto.

1.1.3.1. Polyfunctional (Meth)Acrylate

The polyfunctional (meth)acrylate is not particularly limited, and for example, there may be mentioned a difunctional (meth)acrylate, such as dipropylene glycol di(meth)acrylate (DPGDA), tripropylene glycol di(meth)acrylate (TPGDA), diethylene glycol di(meth)acrylate, triethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethyloltricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, or polytetramethylene glycol di(meth)acrylate: or a polyfunctional (meth)acrylate having at least three functional groups, such as trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate (DPHA), ditrimethylolpropane tetra(meth)acrylate, glycerinpropoxy tri(meth)acrylate, caprolactone-modified trimethylolpropane tri(meth)acrylate, pentaerythritolethoxy tetra(meth)acrylate, or caprolactam-modified dipentaerythritol hexa(meth)acrylate.

Among those mentioned above, dipropylene glycol di(meth)acrylate (DPGDA), tripropylene glycol di(meth)acrylate (TPGDA), or dipentaerythritol hexa(meth)acrylate (DPHA) is more preferable, and dipropyl glycol di(meth)acrylate (DPGDA) is further preferable. Since the polyfunctional (meth)acrylate as described above is used, the curing property of the composition is further improved, and the viscosity thereof tends to be further decreased.

The content of the polyfunctional (meth)acrylate with respect to the total mass of the composition is preferably 5.0 to 35 percent by mass, more preferably 7.0 to 30 percent by mass, and further preferably 10 to 27 percent by mass. Since the content of the polyfunctional (meth)acrylate with respect to the total mass of the composition is in the range described above, the curing property of the composition is further improved, and the viscosity thereof tends to be further decreased.

1.1.4. Oligomer

The oligomer of this embodiment is a multimer containing polymerizable compounds each functioning as a constituent component and is a compound having at least one polymerizable functional group. In addition, the polymerizable compound in this case is not limited to the monofunctional monomer and the polyfunctional monomer described above. In this embodiment, a compound having a molecular weight of 1,000 or more is defined as the oligomer, and a compound having a molecular weight of 1,000 or less is defined as the monomer.

The oligomer as described above is not particularly limited, and for example, an urethane acrylate oligomer having an urethane as a repeating structure, a polyester acrylate oligomer having an ester as a repeating structure, or an epoxy acrylate oligomer having an epoxy as a repeating structure may be mentioned.

Among those oligomers described above, the urethane acrylate oligomer is preferable, an aliphatic urethane acrylate oligomer or an aromatic urethane acrylate oligomer is more preferable, and the aliphatic urethane acrylate oligomer is further preferable. In addition, the urethane acrylate oligomer is preferably an urethane acrylate oligomer having four functions or less and is more preferably an urethane acrylate oligomer having two functions or less. Since the oligomer as described above is used, the viscosity of the composition is further decreased, and the curing property of the composition and the adhesion of the coating film tend to be further improved.

The content of the oligomer with respect to the total mass of the composition is preferably 1.0 to 15 percent by mass, more preferably 1.0 to 10 percent by mass, and further preferably 2.0 to 7.0 percent by mass. Since the content of the oligomer with respect to the total mass of the composition is in the range described above, the viscosity of the composition is further decreased, and the curing property of the composition and the adhesion of the coating film tend to be further improved.

1.2. Photopolymerization Initiator

As the photopolymerization initiator, ethyl (2,4,6-trimethylbenzoyl)phenylphosphinate is used, and if needed, at least one photopolymerization initiator different therefrom may also be used. Since ethyl (2,4,6-trimethylbenzoyl)phenylphosphinate in the form of liquid at ordinary temperature is used, a problem in terms of the solubility of a solid photopolymerization initiator at ordinary temperature can be fundamentally solved. In addition, hereinafter, a simply called "acylphosphine oxide-based photopolymerization initiator" indicates an acylphosphine oxide-based photopolymerization initiator other than ethyl (2,4,6-trimethylbenzoyl)phenylphosphinate.

The content of ethyl (2,4,6-trimethylbenzoyl)phenylphosphinate with respect to the total mass of the composition is preferably 0.5 percent by mass or more, more preferably 1.0 percent by mass or more, even more preferably 2.0 percent by mass or more, further preferably 2.5 percent by mass or more, and even further preferably 3.0 percent by mass or more. Since the content of ethyl (2,4,6-trimethylbenzoyl) phenylphosphinate with respect to the total mass of the composition is 0.5 percent by mass or more, the curing property of the composition is further improved, and even in the case in which at least one photopolymerization initiator different therefrom is also used, since a use amount of the different photopolymerization initiator described above is relatively decreased, the solubility of the photopolymerization initiator tends to be further improved.

In addition, the content of ethyl (2,4,6-trimethylbenzoyl) phenylphosphinate with respect to the total mass of the composition is preferably 17.5 percent by mass or less, more preferably 15 percent by mass or less, even more preferably 12.5 percent by mass or less, further preferably 10 percent by mass or less, and even further preferably 7.5 percent by mass or less. Since the content of ethyl (2,4,6-trimethylbenzoyl)phenylphosphinate with respect to the total mass of the composition is 17.5 percent by mass or less, the viscosity of the composition tends to be further decreased.

Furthermore, the content of ethyl (2,4,6-trimethylbenzoyl)phenylphosphinate with respect to the total mass of the photopolymerization initiators is preferably 10 to 100 percent by mass, more preferably 20 to 80 percent by mass, and even more preferably 30 to 60 percent by mass. Since the content of ethyl (2,4,6-trimethylbenzoyl)phenylphosphinate with respect to the total mass of the photopolymerization initiators is in the range described above, the curing property of the composition is further improved, and even in the case in which at least one photopolymerization initiator different therefrom is also used, since the use amount of the different photopolymerization initiator described above is relatively decreased, the solubility of the photopolymerization initiator tends to be further improved. In addition, the viscosity of the composition also tends to be further decreased.

The different photopolymerization initiator described above is not particularly limited as long as being capable of generating active species by radiation emission, and for example, a known photopolymerization initiator, such as an acylphosphine oxide-based photopolymerization initiator, a thioxanthone-based photopolymerization initiator, an alkylphenone-based photopolymerization initiator, or a benzophenone-based photopolymerization initiator, may be mentioned. Among those mentioned above, the acylphosphine oxide-based photopolymerization initiator or the thioxanthone-based photopolymerization initiator is preferable, and the acylphosphine oxide-based photopolymerization initiator is more preferable. When the photopolymerization initiator as described above is used, the curing property of the composition is further improved, and in particular, the curing property thereof in a curing process performed by light emitted from an ultraviolet light-emitting diode (UV-LED) tends to be further improved. The photopolymerization initiator may be used alone, or at least two types thereof may be used in combination.

The content of the different photopolymerization initiator described above with respect to the total mass of the composition is preferably 1.0 to 10.0 percent by mass, more preferably 1.0 to 8.0 percent by mass, and further preferably 2.0 to 7.0 percent by mass. Since the content of the different photopolymerization initiator is in the range described above, the curing property of the composition and the solubility of the photopolymerization initiator tend to be further improved.

In addition, the total content of the photopolymerization initiators including ethyl (2,4,6-trimethylbenzoyl)phenylphosphinate is preferably 5.0 to 19 percent by mass, more preferably 7.0 to 17 percent by mass, and further preferably 10 to 15 percent by mass. Since the total content of the photopolymerization initiators is in the range described above, the curing property of the composition and the solubility of the photopolymerization initiator tend to be further improved.

The acylphosphine oxide-based photopolymerization initiator is not particularly limited, and for example, there may be mentioned 2,4,6-trimethylbenzoyldiphenylphosphine oxide, bis(2,4,6-trimethylbenzoyl)phenylphosphine oxide, or bis(2,6-dimethoxybenzoyl)-2,4,4-trimethylpentylphosphine oxide.

As a commercially available product of the acylphosphine oxide-based photopolymerization initiator as described above, for example, there may be mentioned Omnirad 819 (bis(2,4,6-trimethylbenzoyl)phenylphosphine oxide), IRGACURE 1800 (mixture of bis(2,6-dimethoxybenzoyl)-2,4,4-trimethylpentylphosphine oxide and 1-hydroxy-cyclohexyl-phenyl ketone at a mass ratio of 25:75), or IRGACURE TPO (2,4,6-trimethylbenzoyldiphenylphosphine oxide).

The content of the acylphosphine oxide-based photopolymerization initiator with respect to the total mass of the composition is preferably 2.0 percent by mass or more, more preferably 2.0 to 15 percent by mass, and further preferably 2.0 to 12 percent by mass. Since the content of the acylphosphine oxide-based photopolymerization initiator is in the range described above, the curing property of the composition and the solubility of the photopolymerization initiator tend to be further improved.

The thioxanthone-based photopolymerization initiator is not particularly limited, and for example, there may be mentioned thioxanthone, 2-methylthioxanthone, 2,4-diethylthioxanthone, 2-isopropylthioxanthone, 4-isopropylthioxanthone, 2-chlorothioxanthone, 2,4-diethylthioxanthone, 2,4-diethylthioxanthen-9-one, diester of carboxymethoxythioxanthone and polytetramethylene glycol, 1,3-di({α-[1-chloro-9-oxo-9H-thioxanthen-4-yl]oxy}acetylpoly[oxy(1- methylethylene)]oxy)-2,2-bis({α-[1-chloro-9-oxo-9H-thioxanthen-4-yl]oxy}acetylpoly[oxy(1-methylethylene)])oxymethylpropane.

The alkylphenone-based photopolymerization initiator is not particularly limited, and for example, there may be mentioned 2-hydroxy-1-(4-(4-(2-hydroxy-2-methylpropyonyl)benzyl)phenyl)-2-methylpropane-1-one, 2-benzyl-2-dimethylamino-1-(4-morpholinophenyl)-buatnone-1, 2-(dimethylamino)-2-[(4-methylphenyl)methyl]-1-[4-(4-morpholinyl)phenyl-1-butanone, 2-methyl-1-(4-methylthiophenyl)-2-morpholinopropane-1-one.

The benzophenone-based photopolymerization initiator is not particularly limited, and for example, 4,4'-bis(diethylamino)benzophenone, 4-chlorobenzophenone, 4,4'-dimethoxybenzophenone, or 4,4-diaminobenzophenone may be mentioned.

1.3. Fluorescent Whitener

The fluorescent whitener is not particularly limited and is able, for example, to absorb light having a wavelength of approximately 300 to 450 nm and to emit light having a wavelength of approximately 400 to 500 nm. The fluorescent whitener as described above is not particularly limited, and for example, there may be mentioned a naphthalene benzoxazolyl derivative, a thiophene benzoxazolyl derivative, a stilbene benzoxazolyl derivative, a coumarin derivative, a styrene biphenyl derivative, a pyrazolone derivative, a stilbene derivative, a styryl derivative of benzene and biphenyl, a bis(benzazole-2-yl) derivative, carbostyril, naphthalimide, a derivative of dibenzothiophene-5,5'-dioxide, a pyrene derivative, or pyridotriazole. Those fluorescent whiteners may be used alone, or at least two types thereof may be used in combination.

As a commercially available product of the fluorescent whitener, for example, TELALUX OB or TELALUX KCB may be mentioned.

The content of the fluorescent whitener with respect to the total mass of the composition is preferably 0.1 to 1 percent by mass and more preferably 0.1 to 0.5 percent by mass. Since the content of the fluorescent whitener is in the range described above, the curing property of the composition tends to be further improved.

1.4. Polymerization Inhibitor

The polymerization inhibitor is not limited to those mentioned below, and for example, there may be mentioned p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), a hindered amine compound, 2,2,6,6-tetramethylpiperidinyl-1-oxyl (TEMPO), or its derivative.

Among those mentioned above, 2,2,6,6-tetramethylpiperidinyl-1-oxyl or its derivative is preferable. Since the polymerization inhibitor as described above is contained, the storage stability of the composition at ordinary temperature and low temperature tends to be further improved. As the derivative of 2,2,6,6-tetramethylpiperidinyl-1-oxyl is not particularly limited, and for example, there may be mentioned 4-acetamide-2,2,6,6-tetramethylpiperidinyl-1-oxyl, 4-amino-2,2,6,6-tetramethylpiperidinyl-1-oxyl, 4-carboxy-2,2,6,6-tetramethylpiperidinyl-1-oxyl, 4-(2-chloroacetamide)-2,2,6,6-tetramethylpiperidinyl-1-oxyl, 4-cyano-2,2,6,6-tetramethylpiperidinyl-1-oxyl, 4-hydroxy-2,2,6,6-tetramethylpiperidinyl-1-oxyl, 4-hydroxybenzoate-2,2,6,6-tetramethylpiperidinyl-1-oxyl, 4-(2-iodoacetamide)-2,2,6,6-tetramethylpiperidinyl-1-oxyl, 4-isothiocyanate-2,2,6,6-tetramethylpiperidinyl-1-oxyl, 4-methacryloyloxy-2,2,6,6-tetramethylpiperidinyl-1-oxyl, 4-methoxy-2,2,6,6-tetramethylpiperidinyl-1-oxyl, 4-oxo-2,2,6,6-tetramethylpiperidinyl-1-oxyl, or 4-(2-propynyloxy)-2,2,6,6-tetramethylpiperidinyl-1-oxyl. Among those mentioned above, 4-hydroxy-2,2,6,6-tetramethylpiperidinyl-1-oxyl is more preferable. Since the polymerization inhibitor as described above is used, the storage stability of the composition tends to be further improved.

The content of the polymerization inhibitor with respect to the total mass of the composition is preferably 0.1 to 0.5 percent by mass and more preferably 0.1 to 0.3 percent by mass. Since the content of the polymerization inhibitor is in the range described above, the storage stability of the composition tends to be further improved.

1.5. Leveling Agent

The leveling agent is not particularly limited, and for example, an acetylene glycol-based surfactant, a fluorine-based surfactant, or a silicone-based surfactant may be mentioned.

The acetylene glycol surfactant is not particularly limited, and for example, 2,4,7,9-tetramethyl-5-decyne-4,7-diol, an alkylene oxide adduct thereof, 2,4-dimethyl-5-decyne-4-ol, or an alkylene oxide adduct thereof may be mentioned.

The fluorine-based surfactant is not particularly limited, and for example, there may be mentioned a perfluoroalkyl sulfonate salt, a perfluoroalkyl carboxylate salt, a perfluoroalkyl phosphate ester, a perfluoroalkyl ethylene oxide adduct, a perfluoroalkyl betaine, or a perfluoroalkylamine oxide compound.

As the silicone-based surfactant, for example, there may be mentioned a polysiloxane-based compound, a polyester-modified silicone, or a polyether-modified organosiloxane. As the polyester-modified silicone, for example, BYK-347, 348, BYK-UV3500, 3510, or 3530 (each manufactured by BYK Additives & Instruments) may be mentioned, and as the polyether-modified silicone, for example, BYK-3570 (manufactured by BYK Additives & Instruments) may be mentioned.

The content of the leveling agent with respect to the total mass of the composition is preferably 0.1 to 1.0 percent by mass and more preferably 0.2 to 0.8 percent by mass. Since the content of the leveling agent is in the range described above, a wettability of the composition tends to be further improved.

1.6. Other Components

The radiation curable ink jet composition according to this embodiment may further contain, if needed, a colorant, such as a pigment or a dye, and/or an additive, such as a dispersant for pigment or the like.

1.7. Method for Manufacturing Radiation Curable Ink Jet Composition

Manufacturing (preparation) of a radiation curable ink jet composition is performed such that components to be contained in the composition are mixed and stirred so as to be sufficiently uniformly mixed with each other. In this embodiment, the preparation of a radiation curable ink jet composition preferably has, in a preparation process, a step of performing at least one of an ultrasonic treatment and a heating treatment on a mixture in which a polymerization initiator and at least parts of monomers are mixed together. Accordingly, a dissolved oxygen content of the composition after the preparation can be reduced, and a radiation curable ink jet composition excellent in ejection stability and storage stability can be obtained. The mixture described above may be a mixture at least containing the components described above and may be a mixture further containing other components to be contained in the radiation curable ink jet composition or a mixture containing all the components to be contained in the radiation curable ink jet composition. The monomers contained in the mixture may be at least parts of the monomers to be contained in the radiation curable ink jet composition.

2. Ink Jet Method

An ink jet method according to this embodiment includes an ejection step of ejecting the radiation curable ink jet composition described above using a predetermined liquid ejection head so as to be adhered to a recording medium and an emission step of emitting radiation rays to the radiation curable ink jet composition adhered to the recording medium.

2.1 Ejection Step

In the ejection step, a heated composition is ejected from the liquid ejection head so as to be adhered to the recording medium. In more particular, a pressure generation device is driven, and the composition filled in a pressure generation chamber of the liquid ejection head is ejected from a nozzle. The ejection method as described above is also called an ink jet method.

As a liquid ejection head 10 used in the ejection step, a line head which performs recording by a line method or a serial head which performs recording by a serial method may be mentioned.

In the line method using a line head, for example, a liquid ejection head having a width larger than a recording width of a recording medium is fixed to an ink jet apparatus. Subsequently, the recording medium is transferred along a sub scanning direction (longitudinal direction or transport direction of the recording medium), and in association with this transfer, ink droplets are ejected from nozzles of the liquid ejection head, so that an image is recorded on the recording medium.

In the serial method using a serial head, for example, a liquid ejection head is mounted on a carriage configured to be transferred in a width direction of a recording medium. Subsequently, the carriage is transferred along a main scanning direction (lateral direction or width direction of the recording medium), and in association with this transfer, ink droplets are ejected from nozzle openings of the head, so that an image can be recorded on the recording medium.

2.2. Emission Step

In the emission step, radiation rays are emitted to the radiation curable ink jet composition adhered to the recording medium. When radiation rays are emitted, the composition is cured since a polymerization reaction of the monomers is started, and hence, a coating film is formed. In this step, when a photopolymerization initiator is present, active species (starting species), such as radicals, acids, and/or bases, are generated, and the polymerization reaction of the monomers is promoted by the function of the starting species. In addition, when a photosensitizer is present, the photosensitizer is excited by absorption of radiation rays and promotes decomposition of the photopolymerization initiator by contact therewith, and the curing reaction can be further performed.

In the case described above, as the radiation rays, for example, ultraviolet rays, infrared rays, visible light rays, or x-rays may be mentioned. By a radiation source provided downstream the liquid ejection head, radiation rays are emitted to the composition. The radiation source is not particularly limited, and for example, an ultraviolet light-emitting diode may be mentioned. By the use of the radiation source as described above, reduction in size and cost of the apparatus can be realized. Since being compact as an ultraviolet ray source, the ultraviolet light-emitting diode can be fitted in the ink jet apparatus.

For example, the ultraviolet light-emitting diode can be fitted to the carriage (at two ends along the medium width direction and/or a medium transport direction side) on which the liquid ejection head to eject the radiation curable ink jet composition is mounted. Furthermore, because of the composition of the radiation curable ink jet composition described above, a high speed curing with low energy can be realized. Radiation energy is calculated by multiplying an emission time by radiation intensity. Hence, the emission time can be decreased, and a printing rate can be increased. On the other hand, the radiation intensity can also be decreased. Accordingly, since a temperature increase of a printed matter can be suppressed, reduction in odor of a cured film may also be obtained.

3. Ink Jet Apparatus

An ink jet apparatus of this embodiment includes a liquid ejection head having nozzles which eject a composition and a pressure chamber to which the composition is supplied; and a radiation source which emits radiation rays to the composition, and as the composition, the radiation curable ink jet composition described above is used. In addition, in the liquid ejection head or in an ink flow path, a heating portion which heats the composition on a recording medium may also be provided.

As one example of the ink jet apparatus, in FIGURE, a perspective view of a serial printer is shown. As shown in FIGURE, a serial printer 20 includes a transport portion 220 and a recording portion 230. The transport portion 220 transports a recording medium F supplied to the serial printer to the recording portion 230 and then discharges a recorded recording medium out of the serial printer. In particular, the transport portion 220 has feed rollers and transports a recording medium F fed thereby in a sub scanning direction T1.

In addition, the recording portion 230 includes an ink jet head 231 which ejects the composition to the recording medium F fed from the transport portion 220, a radiation source 232 which emits radiation rays to the composition adhered to the recording medium F, a carriage 234 which mounts those described above, and a carriage transfer mechanism 235 which transfers the carriage 234 in a main scanning direction S1 or S2 of the recording medium F.

In the case of a serial printer, as the ink jet head 231, a head having a length smaller than the width of a recording medium is provided, and by the transfer of the head, multipass recording is performed. In addition, in the serial printer, the head 231 and the radiation source 232 are mounted on the carriage 234 which is transferred in a predetermined direction, and since the head is transferred in association with the transfer of the carriage, the composition is ejected on the recording medium. Accordingly, recording is performed by at least two passes (multipass). In addition, the pass is also called main scanning. Between the passes, sub scanning which transports the recording medium is performed. That is, the main scanning and the sub scanning are alternately performed.

In addition, in FIGURE, although the case in which the radiation source is mounted on the carriage is shown, the radiation source is not limited thereto and may be not mounted on the carriage.

In addition, the ink jet apparatus of this embodiment is not limited to the above serial type printer and may be the line type printer described above.

4. Recorded Matter

A recorded matter of this embodiment is formed from the above radiation curable ink jet composition which is adhered to a recording medium and is then cured. Since the composition described above has preferable stretchability and adhesion, when post processing, such as cutting and/or bending, is performed, the coating film can be suppressed from being cracked and chipped. Hence, the recorded matter of this embodiment may be preferably used for sign application and the like.

A material of the recording medium is not particularly limited, and for example, there may be mentioned a plastic, such as a poly(vinyl chloride), a poly(ethylene terephthalate), a polypropylene, a polyethylene, a polycarbonate, a cellulose diacetate, a cellulose triacetate, a cellulose propionate, a cellulose butyrate, a cellulose acetate butyrate, a cellulose nitrate, a polystyrene, a poly(vinyl acetal), or a surface-treated plastic selected from those mentioned above; glass, paper, metal, or timber.

EXAMPLES

Hereinafter, although the present disclosure will be described in more detail with reference to examples and comparative examples, the present disclosure is not limited thereto.

1. Preparation of Radiation Curable Ink Jet Composition

First of all, a colorant, a dispersant, and some parts of monomers were charged in a pigment-dispersion tank and were then stirred together with ceramic beads each having a diameter of 1 mm, so that a pigment dispersion liquid in which the colorant was dispersed in the monomers was obtained. Subsequently, after the remaining monomers, a photopolymerization initiator, and a polymerization inhibitor were charged in a stainless steel-made container used as a mixture tank and were mixed and stirred so as to be fully dissolved with each other, the pigment dispersion liquid obtained as described above was charged therein in order to have the composition shown in Table 1. Next, the mixture thus obtained was further mixed and stirred for one hour at ordinary temperature and was then filtrated using a 5-μm membrane filter, so that a radiation curable ink jet composition of each example was obtained. The numerical value of each component shown in each example in the table represents percent by mass. In addition, when an ink jet printer as shown in FIGURE was used, and the ink jet composition shown in Table 1 was recorded on a polycarbonate film, preferable recording was confirmed.

Colorant
  Pigment Blue 15: 3
Dispersant
  Solsperse 36000 (manufactured by Lubrizol, high molecular weight dispersant)
Monofunctional Monomer
  PEA (trade name: "Viscoat #192, manufactured by Osaka Organic Chemical Industry Ltd., phenoxyethyl acrylate")
  ACMO (manufactured by KJ chemicals Corporation, acryloylmorpholine)
  IBXA (manufactured by Osaka Organic Chemical Industry Ltd., isobornyl acrylate)
Polyfunctional Monomer
  VEEA (manufactured by Nippon Shokubai Co., Ltd., acrylic acid 2-(2-vinyloxyethoxy)ethyl)
  DPGDA (trade name: "SR508", manufactured by Sartomer Co., Ltd., dipropylene glycol diacrylate)
  TPGDA (trade name: "Viscoat #310HP", manufactured by Osaka Organic Chemical Industry Ltd., tripropylene glycol diacrylate)
  DPHA (trade name: "A-DPH", manufactured by Shin-Nakamura Chemical Co., Ltd., dipentaerythritol hexaacrylate)
Oligomer
  CN991 (manufactured by Sartomer Co., Ltd., difunctional urethane acrylate oligomer)
Photopolymerization Initiator
  Omnirad 819 (manufactured by IGM Resins B.V., bis(2,4,6-trimethylbenzoyl)phenylphosphine oxide)
  TPO (trade name: "IRGACURE TPO", manufactured by BASF, (2,4,6-trimethylbenzoyl)diphenylphosphine oxide)
  TPO-L (manufactured by LAMBSON, ethyl (2,4,6-trimethylbenzoyl)phenylphosphinate)
  Omnirad 127 (manufactured by IGM Resins B.V., 2-hydroxy-1-(4-(4-(2-hydroxy-2-methylpropionyl)benzyl)phenyl)-2-methylpropane-1-one))
  SS-PI 701 (manufactured by SANYO TRADING CO., LTD., 4,4'-bis(diethylamino)benzophenone)
  OMNIPOL TX (manufactured by IGM Resins B.V., diester of carboxymethoxythioxanthone and polytetramethylene glycol)
  Speedcure 7010 (manufactured by Lambson, 1,3-di({α-[1-chloro-9-oxo-9H-thioxanthen-4-yl]oxy}acetylpoly[oxy(1-methylethylene)]oxy)-2,2-bis({α-[1-chloro-9-oxo-9H-thioxanthen-4-yl]oxy}acetylpoly[oxy(1-methylethylene)])oxymethylpropane)
  DETX (trade name: "Speedcure DETX", manufactured by Lambson, 2,4-diethylthioxanthene-9-one)
Plymerization Inhibitor
  MEHQ (trade name: "p-methoxyphenol", manufactured by Kanto Chemical Co., Inc., hydroquinone monomethyl ether)
  LA-7RD (trade name: "ADEKSTAB LA-7RD", manufactured by ADEKA Corporation, 4-hydroxy-2,2,6,6-tetramethylpiperidinyl-1-oxyl)
Fluorescent Whitener
  TELALUX KCB (manufactured by Clariant (Japan) K.K., 1,4-bis(2-benzoxazolyl)naphthalene)
Leveling Agent
  BYK-UV3500 (manufactured by BYK Additives & Instruments, polyether-modified polydimethylsiloxane having an acryloyl group)

2. Evaluation Method

2.1. Evaluation of Viscosity

By using a rotatory viscometer (trade name: "Rheometer MCR-301", manufactured by Anton Paar), in an environment at 20° C., the viscosity of each radiation curable ink jet composition was measured. The evaluation criteria are as follows.

Evaluation Criteria
  A: viscosity of less than 10 mPa·s
  B: viscosity of 10 to less than 15 mPa·s
  C: viscosity of 15 mPa·s or more

2.2. Evaluation of Curing Property

A cotton swab-rubbing tackiness evaluation was performed. In particular, after the radiation curable ink jet composition was applied to a poly(vinyl chloride) medium by a bar coater so that the ink jet composition had a thickness of 10 μm, ultraviolet rays were emitted at a rate of 0.04 sec/cm and at a predetermined radiation intensity. In this case, as a light source, an LED having a peak wavelength of 395 nm was used. Subsequently, the coating film surface was rubbed with a cotton swab, and the curing property of the composition was evaluated based on radiation energy by which the cotton swab was not colored. The evaluation criteria are as follows.

Evaluation Criteria
A: Radiation energy of less than 200 mJ/cm$^2$
B: Radiation energy of 200 to less than 350 mJ/cm$^2$
C: Radiation energy of 350 mJ/cm$^2$ or more 2.3. Evaluation of Adhesion A cured coating film was formed on a poly(vinyl chloride) film in a manner similar to that of the evaluation of the curing property. Subsequently, on the coating film (hereinafter, also referred to as "cured film" in some cases) thus obtained, a crosscut test evaluation was performed in accordance with JIS K5600-5-6.

In more particular, a blade of a cutting tool was brought into contact with the coating film at an angle orthogonal thereto, and cutting lines with 1 mm intervals were formed by the blade, so that a lattice having 10×10 squares was formed. After a transparent adhesive tape (width: 25 mm) having a length of approximately 75 mm was adhered to the lattice, the tape was sufficiently rubbed with a finger so that the cured film could be observed through the tape. Subsequently, within 5 minutes after the tape was adhered, the tape was surely peeled away from the cured film in 0.5 to 1.0 second at an angle of approximately 60°, and the condition of the lattice was observed by visual inspection. The evaluation criteria are as follows.

Evaluation Criteria
A: peeling of the cured film is observed in less than 10% of the lattice.
B: peeling of the cured film is observed in 10% to less than 35% of the lattice.
C: peeling of the cured film is observed in 35% or more of the lattice.

2.4. Evaluation of Abrasion Resistance

The radiation curable ink jet composition was applied on a poly(vinyl chloride) film (JT5829R, manufactured by MACtac) by a bar coater to have a thickness of 10 μm. Subsequently, by using a metal halide lamp (manufactured by Eye Graphics Co., Ltd.), curing was performed by an energy of 400 mJ/cm$^2$, so that a cured coating film was formed. Next, in accordance with JIS K5701 (ISO 11628) (standard of a method for testing an ink, paint vehicle, and printed matter in lithography), the abrasion resistance was evaluated using a Gakushin-type abrasion fastness tester (manufactured by TESTER SANGYO CO., LTD.). In particular, after a surface of the coating film was covered with a cotton cloth and was then rubbed 50 times with a load of 500 g, peeling of a cured surface of the recorded matter was evaluated by visual inspection. The evaluation criteria are as follows.

Evaluation Criteria
A: contamination of cotton cloth, peeling of image surface, and scratch thereon are no observed.
B: At least one of contamination of cotton cloth, peeling of image surface, and scratch thereon is observed.

2.5. Storage Stability

The radiation curable ink jet composition was filled in a glass bottle and was then stored at 60° C. for 14 days. The viscosities thereof before and after the storage were measured, and the change in viscosity before and after the storage was confirmed. The evaluation criteria are as follows.

Evaluation Criteria
A: Increase rate of less than 10%
B: Increase rate of 10% or more 2.6. Low-Temperature Storage Stability The radiation curable ink jet composition was filled in a glass bottle and was then stored at −20° C. for 7 days. The conditions of the radiation curable ink jet composition before and after the storage were confirmed by visual inspection. The evaluation criteria are as follows.

Evaluation Criteria
A: No generation of foreign materials is observed.
B: Generation of foreign materials is observed.

TABLE 1

| | | EXAMPLE | | | | | | | | | | | COMPARATIVE EXAMPLE | | | |
|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 |
| COLORANT | Pigment Blue 15:3 | 2.0 | 2.0 | 2.0 | | 2.0 | 2.0 | 2.0 | 2.0 | 2.0 | 2.0 | 2.0 | 2.0 | 2.0 | 2.0 | 2.0 |
| DISPERSANT | Solsperse36000 | 0.5 | 0.5 | 0.5 | | 0.5 | 0.5 | 0.5 | 0.5 | 1.0 | 0.5 | 0.5 | 0.5 | 0.5 | 0.5 | 0.5 |
| POLY-FUNCTIONAL MONOMER | VEEA | 15.0 | 15.0 | 40.0 | 15.0 | 15.0 | 30.0 | 30.0 | 30.0 | 30.0 | 50.0 | 60.0 | 15.0 | 40.0 | 15.0 | 10.0 |
| | DPGDA | 20.0 | 10.0 | 15.0 | 15.0 | 10.0 | 10.0 | 10.0 | 11.5 | 10.0 | 16.4 | 6.4 | 20.0 | 46.4 | 20.0 | 20.0 |
| | TPGDA | | | 10.0 | 10.0 | | | | | | | | | | | |
| | DPHA | | | | | | | | 5.0 | 3.0 | | | | | | |
| MONO-FUNCTIONAL MONOMER | PEA | 47.4 | 30.0 | 0.0 | 30.0 | 30.0 | 30.0 | 30.0 | 25.0 | 25.0 | 20.0 | 20.0 | 47.4 | | 47.4 | 47.4 |
| | ACMO | | | | | | | 10.0 | | 10.0 | | | | | | |
| | IBXA | | 33.4 | 21.4 | 16.2 | 33.6 | 18.5 | 9.6 | 10.0 | 9.2 | | | | 4.0 | 4.0 | 5.0 |
| OLIGOMER | CN991 | | | | 5.0 | | | | | | | | | | | |
| PHOTOPOLY-MERIZATION INITIATOR | Omnirad 819 | 4.0 | 4.0 | 5.0 | 4.0 | 4.0 | 4.0 | 6.0 | | 3.0 | 5.0 | 5.0 | 4.0 | 6.0 | | 4.0 |
| | TPO | | | | | | | | | | | | | 10.0 | | 10.0 | 10.0 |
| | TPO-L | 10.0 | 4.0 | 5.0 | 4.0 | 4.0 | 4.0 | 1.0 | 15.0 | 3.0 | 5.0 | 5.0 | | | | |
| | DETX | 0.2 | 0.2 | 0.2 | | 0.2 | 0.2 | | 0.1 | | 0.2 | 0.2 | 0.2 | 0.2 | 0.2 | 0.2 |
| | Omnirad 127 | | | | | | | | | 1.0 | | | | | | |
| | SB-PI 701 | | | | | | | | | 1.0 | | | | | | |
| | OMNIPOL TX | | | | | | | | | 0.5 | | | | | | |
| | Speercure7010 | | | | | | | | | 0.5 | | | | | | |

TABLE 1-continued

|  |  | EXAMPLE | | | | | | | | | | | COMPARATIVE EXAMPLE | | | |
|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 |
| INHIBITOR | MEHQ | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
|  | LA-7RD | 0.1 | 0.1 | 0.1 |  | 0.1 | 0.0 | 0.1 | 0.1 |  | 0.1 | 0.1 | 0.1 | 0.1 | 0.1 | 0.1 |
| FLUORESCENT WHITENER | KCB | 0.2 | 0.2 | 0.2 | 0.2 | 0.0 | 0.2 | 0.2 | 0.2 | 0.2 | 0.2 | 0.2 | 0.2 | 0.2 | 0.2 | 0.2 |
| LEVELING AGENT | BYK-UV3500 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
|  | TOTAL | 100 | 100 | 100 | 100 | 100 | 100 | 100 | 100 | 100 | 100 | 100 | 100 | 100 | 100 | 100 |
| EVALUATION ITEM | INK VISCOSITY | B | B | A | B | B | A | B | A | A | A | A | C | B | B | C |
|  | CURING PROPERTY | A | A | A | A | B | A | A | B | A | A | A | A | C | C | C |
|  | ADHESION | A | A | B | A | A | A | A | A | A | B | C | A | C | A | B |
|  | ABRASION RESISTANCE | B | A | A | A | A | A | A | B | A | B | A | B | A | B | B |
|  | STORAGE STABILITY | A | A | A | B | A | B | A | A | A | A | A | B | A | B | B |
|  | LOW-TEMPERATURE STORAGE STABILITY | A | A | A | A | A | B | B | A | A | A | A | B | B | B | A |

3. Evaluation Result

In Table 1, the compositions of the radiation curable ink jet compositions used in the examples, and the evaluation results thereof are shown. From Table 1, it is found that the radiation curable ink jet compositions of Examples 1 to 11 in each of which the vinyl ether group-containing (meth) acrylate and ethyl (2,4,6-trimethylbenzoyl)phenylphosphinate are contained have a low viscosity and are excellent not only in curing property but also in abrasion resistance, adhesion, storage stability, and low-temperature storage stability.

In more particular, by comparison between each example and Comparative Example 4, it is found that since a predetermined amount of the vinyl ether group-containing (meth) acrylate is contained, the viscosity is decreased, and the curing property is further improved.

In addition, by comparison between each example and Comparative Examples 1 and 3, it is found that when a large amount of phenoxyethyl acrylate is used in order to dissolve a solid photopolymerization initiator at ordinary temperature, the degree of freedom of the polymerizable compounds is decreased, the viscosity of the composition is increased, and/or the curing property thereof is degraded.

Furthermore, by comparison between each example and Comparative Example 2, it is found that when phenoxyethyl acrylate is not used, although the viscosity causes no problems, the solubility of the photopolymerization initiator cannot be regarded as sufficient, and the curing property of the composition and the adhesion of the coating film are degraded. It is also found that when the acrylate is contained, the curing property of the composition and the abrasion resistance of the coating film are improved.

What is claimed is:

1. A radiation curable ink jet composition comprising:
   polymerizable compounds;
   a photopolymerization initiator;
   2,2,6,6-tetramethylpiperidinyl-1-oxyl or a derivative thereof; and
   a fluorescent whitener,
   wherein the fluorescent whitener is at least one selected from the group consisting of a naphthalene benzoxazolyl derivative, a thiophene benzoxazolyl derivative, a stilbene benzoxazolyl derivative, a coumarin derivative, a styrene biphenyl derivative, a pyrazolone derivative, a stilbene derivative, a styryl derivative of benzene and biphenyl, a bis(benzazole-2-yl) derivative, carbostyril, naphthalimide, a derivative of dibenzothiophene-5,5'-dioxide, a pyrene derivative, or pyridotriazole,
   the polymerizable compounds include a vinyl ether group-containing (meth)acrylate represented by the following general formula (I),
   a content of the vinyl ether group-containing (meth) acrylate with respect to a total mass of the radiation curable ink jet composition is 15 percent by mass or more, and
   the photopolymerization initiator includes ethyl (2,4,6-trimethylbenzoyl)phenylphosphinate, $$H_2C=CR^1-CO-OR^2-O-CH=CH-R^3 \qquad (I)$$

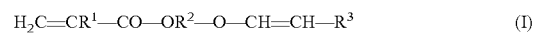

where in the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

2. The radiation curable ink jet composition according to claim 1,
   wherein a content of the ethyl (2,4,6-trimethylbenzoyl) phenylphosphinate with respect to the total mass of the radiation curable ink jet composition is 2.0 percent by mass or more.

3. The radiation curable ink jet composition according to claim 1,
   wherein the content of the vinyl ether group-containing (meth)acrylate with respect to the total mass of the radiation curable ink jet composition is 50 percent by mass or less.

4. The radiation curable ink jet composition according to claim 1,
   wherein the polymerizable compounds include an aromatic-based monofunctional monomer, and
   a content of the aromatic-based monofunctional monomer with respect to the total mass of the radiation curable ink jet composition is 5.0 to 30 percent by mass.

5. The radiation curable ink jet composition according to claim 1,
wherein the polymerizable compounds include a polyfunctional (meth)acrylate.

6. The radiation curable ink jet composition according to claim 1,
wherein the polymerizable compounds include a urethane acrylate.

7. The radiation curable ink jet composition according to claim 1,
wherein the photopolymerization initiator further includes an acylphosphine oxide-based initiator besides the ethyl (2,4,6-trimethylbenzoyl)phenylphosphinate.

8. An ink jet method comprising:
an ejection step of ejecting the radiation curable ink jet composition according to claim 1 by a liquid ejection head so as to be adhered to a recording medium; and
an emission step of emitting radiation rays to the radiation curable ink jet composition adhered to the recording medium.

9. A radiation curable ink jet composition comprising:
polymerizable compounds;
at least one photopolymerization initiator;
2,2,6,6-tetramethylpiperidinyl-1-oxyl or a derivative thereof; and
a fluorescent whitener,
wherein the fluorescent whitener is at least one selected from the group consisting of a naphthalene benzoxazolyl derivative, a thiophene benzoxazolyl derivative, a stilbene benzoxazolyl derivative, a coumarin derivative, a styrene biphenyl derivative, a pyrazolone derivative, a stilbene derivative, a styryl derivative of benzene and biphenyl, a bis(benzazole-2-yl) derivative, carbostyril, naphthalimide, a derivative of dibenzothiophene-5,5'-dioxide, a pyrene derivative, or pyridotriazole,
the polymerizable compounds include a vinyl ether group-containing (meth)acrylate represented by the following general formula (I),
a content of the vinyl ether group-containing (meth)acrylate with respect to a total mass of the radiation curable ink jet composition is 15 percent by mass or more, and
the at least one photopolymerization initiator includes ethyl (2,4,6-trimethylbenzoyl)phenylphosphinate, an amount of the ethyl (2,4,6-trimethylbenzoyl)phenylphosphinate being 30 to 60% by mass relative to a total amount of the at least one photopolymerization initiator contained in the radiation curable ink jet composition,

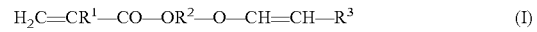
(I)

where in the formula, $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.

* * * * *